Feb. 11, 1964     C. W. JEEP, JR., ETAL     3,121,145
FLUID PRESSURE OPERATED SWITCH
Filed June 13, 1960

INVENTORS
CHARLES W. JEEP JR.
EDGAR W. NIEMEYER
BY

AGENT

United States Patent Office 3,121,145
Patented Feb. 11, 1964

3,121,145
FLUID PRESSURE OPERATED SWITCH
Charles W. Jeep, Jr., Webster Groves, and Edgar W. Niemeyer, Normandy, Mo., assignors to ACF Industries, Incorporated, New York, N.Y., a corporation of New Jersey
Filed June 13, 1960, Ser. No. 35,799
10 Claims. (Cl. 200—83)

This invention relates to fluid pressure switches, and more particularly to an oil pressure switch for automotive use.

Among the several objects of the invention may be noted the provision of an improved fluid pressure switch, and more particularly an oil pressure switch, which is particularly useful in a fuel supply system for the internal combustion engine of an automotive vehicle of the type including an electric pump in the fuel tank of the vehicle, the pressure switch being adapted to initiate operation of the pump on closing the starter switch for the engine and to maintain the pump in operation in response to development of oil pressure by the usual engine-operated oil pump after the starter switch opens; the provision of a pressure switch such as described which is economical to manufacture, of rugged construction and reliable in use; and the provision of a switch such as described which is also adapted to control an oil pressure warning signal, such as the usual oil pressure warning lamp on the dashboard of the vehicle. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a diagram of a fuel supply system for the engine of an automotive vehicle having an oil pressure switch of this invention incorporated therein;

Corresponding reference characters indicate corresponding parts throughout the several views of the drawings.

Figure 1:
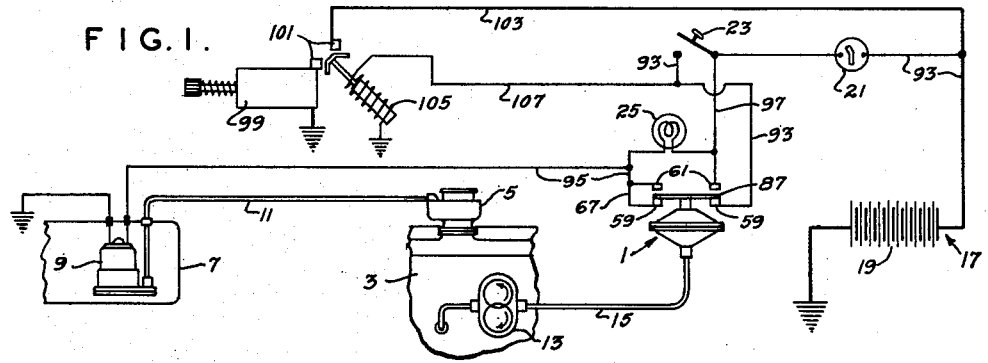
Figure 2:
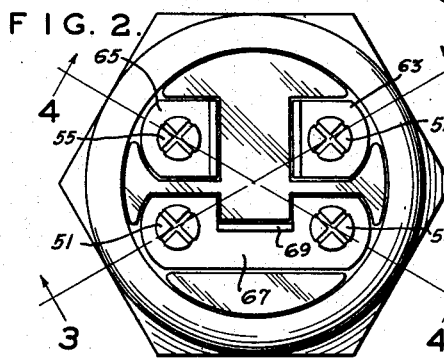
FIG. 2 is a plan view of the oil pressure switch per se.
Figure 4:
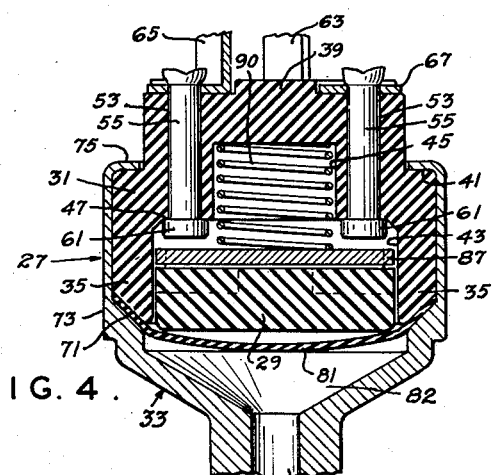
FIG. 4 is a longitudinal cross section of the switch taken on line 4—4 of FIG. 2.
Figure 3:
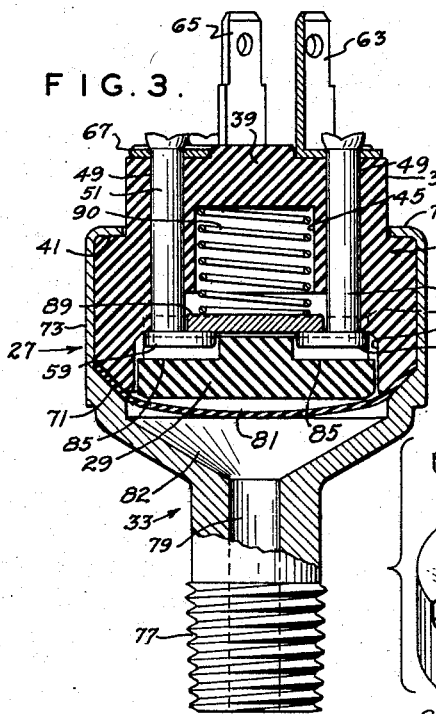
FIG. 3 is a longitudinal cross section of the switch taken on line 3—3 of FIG. 2.
Figure 5:
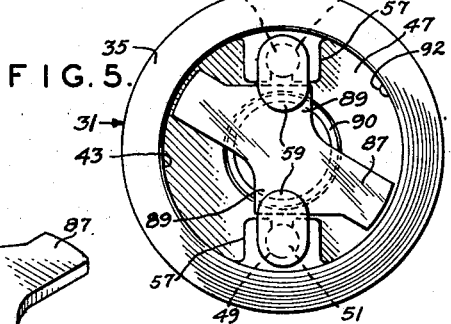
FIG. 5 is a bottom plan view of a subassembly of the switch.
Figure 6:
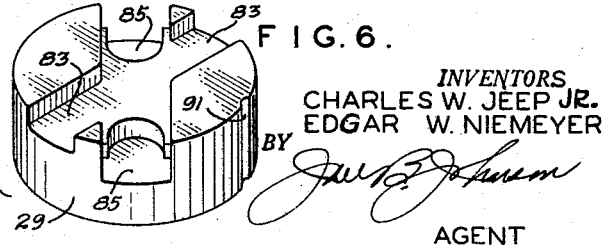
FIG. 6 is an exploded perspective showing a piston and a contactor of the switch.

Referring to the drawings, FIG. 1 illustrates a fuel supply system for the engine of an automotive vehicle having an oil pressure switch 1 of this invention incorporated therein. The switch is shown diagrammatically in FIG. 1 better to illustrate its function. The engine is indicated at 3, and is shown with the usual carburetor 5 thereon. At 7 is indicated the fuel tank of the vehicle. In this tank is an electric fuel pump 9 for pumping fuel from the tank through a fuel line 11 to the carburetor. At 13 is indicated the usual oil pump which is driven by the engine for pumping oil to various engine lubrication points. The oil pressure switch 1 of this invention is responsive to oil pressure developed by pump 13, being connected to the outlet of pump 13 by an oil line 15. Switch 1 is a double-throw switch, and is connected in a circuit generally indicated at 17 which includes the battery 19, the ignition switch 21, and the starter switch 23 of the vehicle for effecting operation of the electric pump 9 on closing the starter switch 23 and for maintaining the pump 9 in operation in response to development of oil pressure by the engine-driven oil pump 13 after the engine has been started and switch 23 has been released.

An oil pressure warning lamp 25, which as will be readily understood is conventionally provided on the dash of the vehicle, is also connected in the circuit 17 in such manner that the lamp is energized whenever the oil pressure is below a predetermined value, as determined by the oil pressure switch 1.

As illustrated in detail in FIGS. 2–6, the pressure switch 1 comprises a cylinder designated in its entirety by reference character 27 and a piston 29 movable in the cylinder. The cylinder consist of two parts: a cup-shaped electrical insulation body 31 and a head 33 (which may be made of metal) at the open end of the cup-shaped body. The body 31 may be made of a suitable heat-resistant synthetic plastic material, for example, a phenolic resin material. It has an annular cylindric wall 35 and a reduced-diameter portion 37 at its closed end 39, providing an external annular shoulder 41. Interiorly, the body 31 has a cylindric chamber 43 and a recess 45 of smaller diameter than chamber 43 extending from chamber 43 toward the closed end 39 of the body. This construction provides an interior annular shoulder 47 at the inner end of the chamber 43.

Body 31 has two holes 49 extending from its closed end to the shoulder 47 for the reception of a first pair of electrically conductive rivets 51, which may be made of copper, for example. Holes 49 are located on one diameter of the body 31, on opposite sides of the recess 45. This diameter of the body is that denoted by the section line 3—3 in FIG. 2. Body 31 also has two holes 53 extending from its closed end to the shoulder 47 for the reception of a second pair of electrically conductive rivets 55, which may also be made of copper, for example. Holes 53 are located on another diameter of body 31 on opposite sides of the recess 45. This diameter of the body is that denoted by the section line 4—4 of FIG. 2. Also, body 31 is integrally formed with U-shaped ribs 57 (see FIG. 5) extending from the shoulder 47 in the direction toward the open end of the body, the grooves or channels defined by these U-shaped ribs being aligned with the holes 49.

Rivets 51 are identical, each having an elongate head 59 projecting laterally outward from the shank of the rivet, and engaging the end of the respective U-shaped rib 57 within the cup-shaped body 31. Each rivet 51 is inserted through the respective hole 49 from the inside of the body 31. Rivets 55 are identical, each being shorter than rivets 51 and having a circular button head 61 engaging the annular shoulder 47. Each rivet 55 is inserted through the respective hole 53 from the inside of the cup-shaped body 31. One of the rivets 51 extends through a hole in the foot of an L-shaped terminal 63 located on the outside of the closed end of the cup-shaped body, and the outer end of this rivet is upset as appears in FIGS. 2 and 3 to hold the rivet in its hole 49 and to hold the terminal 63 on the body. One of the rivets 55 extends through a hole in the foot of an L-shaped terminal 65 located on the outside of the closed end of the body 31, and the outer end of this rivet is upset as appears in FIGS. 2 and 4 to hold the rivet in its hole 53 and to hold the terminal 65 on the body. The other rivet 51 and the other rivet 55 extend through holes in an electrically conductive plate 67 located on the outside of the closed end of the cup-shaped body 31, and have their outer ends upset as appears in FIGS. 2–4 to hold the rivets in their holes and to hold plate 67 on the body. Plate 67 has an upturned terminal portion 69.

The head 33 at the open end of the cup-shaped body 31 is of conical form with a conical annular shoulder at 71. A cylindrical skirt 73 extending from the head 33 surrounds the annular wall 35 of the cup-shaped body 31. The rim of the skirt 73 is bent over on the external annular shoulder 41 of body 31 as indicated at 75 to hold the body 31 and the head 33 assembled, thereby to constitute the cylinder 27. The head 33 has a screw-threaded extension 77 for connection of the aforesaid oil line 15. In this extension is a port 79 for admission of oil under pressure to the space within the conical head 33. A flexible diaphragm 81, which may be made of a suitable oil-resistant synthetic rubber and which may have nylon cord reinforcement embedded therein, is clamped on a 45° angle between the annular shoulder 71 of the head 33 and the conical end of the annular wall 35 of the cup-shaped body 31. This provides clearance between diaphragm 81 and piston 29, when the diaphragm is in operation. Diaphragm 81 seals off the space within the cup-shaped body 31 from the port 79 and provides a pressure chamber 82 below the diaphragm.

The piston 29 is slidable in the cylindrical chamber 43 within the cup-shaped body 31. It consists of a disk of electrical insulation material, and may be made of the same heat-resistant insulation material as the cup-shaped body 31. It simply has a loose sliding fit in chamber 43. There is no necessity for the piston having a sliding sealing fit in the chamber 43 in view of the provision of the diaphragm 81. The piston is formed with a diametrical groove 83 in its inside face (i.e., its face toward the closed end 39 of the cup-shaped body 31). The piston is also formed with two recesses 85 on opposite sides of the groove 83. These recesses are deeper than the groove and accept the U-shaped ribs 57 of the cup-shaped body 31 and the elongate heads 59 of the rivets 51. An electrically conductive blade 87, of copper, for example, which constitutes the contactor of the switch, is seated in the groove 83. The end portions of this contactor are adapted to engage the heads 61 of the shorter rivets 55. The contactor also has lateral wing portions 89 which project out over the recesses 85 in the piston and over the elongate heads 59 of the longer rivets 51, and which are adapted to engage these elongate heads. As appears in FIGS. 3 and 5, these wing portions of the contactor are located on the sides of the elongate heads 59 toward the closed end 39 of the cup-shaped body 31. A coil compression spring 90 reacts from the end of the recess 45 in the cup-shaped body 31 against the contactor to bias the contactor and the piston to move in the direction away from the closed end of the cup-shaped body. The piston is held from rotating by engagement of ribs 57 in piston recesses 85, and this keeps contactor 87 aligned with rivet heads 61. The piston may also be provided with a peripheral notch 91 receiving a rib 92 on the inside of annular wall 35 of body 31 for facilitating positioning of the piston during assembly. This also keeps the piston from rotating.

Rivet heads 59 constitute a first pair of switch contacts engageable by contactor 87 when oil pressure in chamber 82 is below a predetermined value as determined by spring 91. Rivet heads 61 constitute a second pair of switch contacts engageable by contactor 87 when the oil pressure in chamber 82 attains this value. As shown in FIG. 1, battery 19, ignition switch 21, and starter switch 23 are connected in series in a line 93 connected to terminal 63 and consequently connected to the respective rivet head or contact 59. The plate 67 (denoted in FIG. 1 as a line) constitutes a terminal common to the other contact 59 and one of the contacts 61. The electric pump 9 is connected in a line 95 extending from this common terminal 67. A line 97 for shutting the starter switch is connected to the other contact 61. Lamp 25 is connected between lines 97 and 95. The starter motor 99 for engine 3 and the starter relay contacts 101 are shown as connected in series in a line 103 in parallel with starter switch 23. The coil 105 of the starter relay is connected in a line 107 in series with the starter switch 23. The inside diameter of shoulder 71 is larger than the inside diameter of the cylindrical chamber 43. This factor, together with the 45° angle clamping support of the diaphragm and the clearance between piston 29 and the diaphragm 81 insures that the diaphragm 81 will be out of the way of piston 29 at zero or very low applied pressures in chamber 82.

Operation is as follows:

When the engine 3 is not running, oil pump 13 is out of operation. Spring 90 then holds contactor 87 down so that it bridges contacts 59 (see FIGS. 1 and 3) with substantial pressure on the contacts for low contact resistance. With the ignition switch 21 closed, when the starter switch 23 is closed to energize the starter motor 99 to crank the engine, a circuit for the electric fuel pump 9 is completed via line 93, contactor 87, terminal plate 67 and line 95. When the engine 3 has started, starter switch 23 is opened. With the engine running, oil pump 13 is driven and pressure developed by the pump is transmitted via line 15 to pressure chamber 82 of the pressure switch 1. This pressure flexes diaphragm 81 upward to move piston 29 and contactor 87 upward so that the contactor bridges contacts 61 with substantial pressure on the contacts for low contact resistance. A circuit for the electric fuel pump is then completed via line 97, closed contacts 61, terminal plate 67 and line 95. Lamp 25 glows when contactor 87 is down to warn of low oil pressure, and is shunted by contactor 87 when the latter is up so that it goes out. The resistance of the filament of the lamp is such that current to electric pump 9 is insufficient for operation of the pump when ignition switch 21 is closed before the starter switch 23 is closed.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A fluid pressure switch comprising means defining a pressure chamber adapted for connection to a source of fluid under pressure, a member movable in one direction in response to pressure in said chamber, an electrically conductive contactor movable with said member and located on the opposite side of said member from said chamber, means biasing said contactor and member to move in a direction opposite to said one direction, a first pair of contacts against which said contactor is biased by said biasing means when the pressure in said chamber is below a predetermined value, and a second pair of contacts in the path of movement of said contactor to be engageable by said contactor on movement of said member and contactor in said one direction when the pressure in said chamber attains said value, said member including an electrically insulating piston having a diametrical groove in the opposite side thereof from said chamber and recesses deeper than said groove on opposite sides of said groove receiving said first pair of contacts, said contactor comprising a blade seated in said groove and having portions projecting out over said recesses and said first contacts and located on the side of said first pair of contacts away from said chamber.

2. A fluid pressure switch as set forth in claim 1, said chamber being closed by a flexible diaphragm, said piston engaging said diaphragm.

3. A fluid pressure switch comprising a cylinder having a port at one end for connection to a source of fluid pressure, an electrically insulating piston movable in said cylinder, an electrically conductive contactor movable with said piston and located on the side of said piston away from said ported cylinder end, means biasing said piston and contactor to move in the direction toward said ported end of said cylinder, means for moving said piston and contactor away from said ported end of the cylinder against said biasing means in response to development of a predetermined fluid pressure in said ported end of said cylinder, a first pair of electrical contacts in said cylinder against which said contactor is biased by said biasing means when the fluid pressure in said ported end of said cylinder is below said value, and a second pair of electrical contacts in the cylinder in the path of movement of said contactor to be engageable by said contactor on movement of the piston and contactor away from said ported end of said cylinder in response to development therein of said predetermined fluid pressure, said piston having a diametrical groove in the side thereof away from said ported end of cylinder and having recesses deeper than said groove on opposite sides of said groove receiving said first pair of contacts, said contactor comprising a blade seated in said groove, with portions projecting out over said recesses and said first contacts and located on the side of said first pair of contacts away from said ported end of the cylinder.

4. A fluid pressure switch as set forth in claim 3 wherein a flexible diaphragm is provided in the cylinder between said port and said piston defining a sealed pressure chamber, said piston engaging said diaphragm.

5. A fluid pressure switch as set forth in claim 4 wherein said contacts are constituted by the heads of rivets which extend into the cylinder from the other end thereof.

6. A fluid pressure switch comprising a cup-shaped electrically insulating body, a head on the open end of the cup-shaped body having a port for connection to a source of fluid under pressure, a flexible diaphragm clamped between said head and said body defining a pressure chamber in said head and sealing the interior of said body from said chamber, an electrically insulating disk slidable in said body and engaging said diaphragm, an electrically conductive contactor movable with said disk and located on the side of said disk away from said diaphragm, a spring in said body biasing said contactor and disk in the direction toward said head, said disk and contactor being movable in the opposite direction by said diaphragm against the spring bias in response to development of a predetermined fluid pressure in said pressure chamber, a first pair of contacts in said body against which said contactor is biased by said spring when the fluid pressure is below said value, and a second pair of contacts in said body in the path of movement of said contactor to be engageable by said contactor on movement of said disk and contactor in said opposite direction in response to development in said pressure chamber of said predetermined fluid pressure, said disk having a diametrical groove in the side thereof away from said diaphragm, said contactor comprising a blade seated in said groove, said disk having recesses deeper than said groove on opposite sides of said groove receiving said first pair of contacts, said blade having portions projecting out over said recesses and between said first pair and said second pair of contacts.

7. A fluid pressure switch as set forth in claim 6 wherein said contacts are constituted by the heads of rivets which extend into said cup-shaped body from the closed end thereof.

8. A fluid pressure switch comprising a cup-shaped body of electrically insulating material closed at one end, means closing said body at its open end and having a port for connection to a source of fluid under pressure, said body having a pair of ribs on the inside thereof extending lengthwise of said body from its closed end at diametrically opposite sides of said body, a first pair of electrically conductive rivets received in holes in the closed end of said body having heads constituting a first pair of contacts engaging the ends of the ribs, a second pair of electrically conductive rivets received in holes in the closed end of said body having heads constituting a second pair of contacts engaging the inside of the closed end of said body and spaced from the first pair of contacts, a piston of electrically insulating material movable in said cup-shaped body, said piston having a diametrical groove in the side thereof toward the closed end of said body, an electrically conducting contactor seated in said groove, said piston having recesses deeper than said groove on opposite sides of said groove receiving said ribs and said first pair of contacts, said contactor having portions projecting out over said recesses and located between said first pair and said second pair of contacts toward the closed end of said body, and means biasing the piston and contactor to move in the direction away from said closed end of said body for engagement of said projecting portions of the contactor with said first pair of contacts, said piston and contactor being movable toward said closed end of said body against said biasing means in response to development of a predetermined fluid pressure in said other end of said body for engagement of said contactor with said second pair of contacts.

9. A fluid pressure switch comprising a cup-shaped body of electrically insulating material, a head on the open end of the cup-shaped body having a port for connection to a source of fluid under pressure, a flexible diaphragm clamped between the head and the body defining a pressure chamber in the head and sealing the interior of the body from said chamber, said body having a pair of ribs on the inside thereof extending lengthwise from its closed end at diametrically opposite sides of the body, a first pair of electrically conductive rivets received in holes in the closed end of the cup-shaped body having heads constituting a first pair of contacts engaging the ends of the ribs, a second pair of electrically conductive rivets shorter than the first pair received in holes in the closed end of the cup-shaped body having heads constituting a second pair of contacts engaging the inside of the closed end of the body and spaced from the first pair of contacts, a disk of electrically insulating material slidable in the cup-shaped body, said disk having a diametrical groove in the side thereof toward the closed end of the cup-shaped body, an electrically conducting contactor seated in the groove, said disk having recesses deeper than said groove on opposite sides of said groove receiving said ribs and said first pair of contacts, said contactor having portions projecting out over said recesses and located between said first and said second pair of contacts toward the closed end of the body, and a spring in said body biasing the disk and contactor to move in the direction away from said closed end of the cup-shaped body for engagement of said projecting portions of the contactor with said first pair of contacts, said disk and contactor being movable toward said closed end of the cup-shaped body against the bias of said spring by the diaphragm in response to development of a predetermined fluid pressure in said pressure chamber for engagement of said contactor with said second pair of contacts.

10. A fluid pressure switch as set forth in claim 9 wherein the outer ends of the rivets are upset over terminals on the outside of the closed end of the cup-shaped body.

References Cited in the file of this patent

UNITED STATES PATENTS

| | | |
|---|---|---|
| Re. 23,340 | Lincoln | Feb. 13, 1951 |
| 1,243,875 | Price | Oct. 23, 1917 |
| 1,408,221 | Pendergast | Feb. 28, 1922 |
| 2,345,023 | Yarbrough et al. | Mar. 28, 1944 |
| 2,430,428 | Katcher | Nov. 4, 1947 |
| 2,445,756 | Bean | July 27, 1948 |
| 2,466,111 | Katcher et al. | Apr. 5, 1949 |

FOREIGN PATENTS

| | | |
|---|---|---|
| 1,113,482 | France | Dec. 5, 1955 |
| 765,403 | Great Britain | Jan. 9, 1957 |